United States Patent
Bohler

(10) Patent No.: US 6,601,856 B2
(45) Date of Patent: Aug. 5, 2003

(54) METHOD AND DEVICE FOR THE DYNAMIC LUBRICATION OF A POWER CHUCK

(75) Inventor: Erwin Bohler, Bettwiesen (CH)

(73) Assignee: Forkardt Schweiz AG, Effretikon (CH)

( * ) Notice: Subject to any disclaimer, the term of this patent is extended or adjusted under 35 U.S.C. 154(b) by 38 days.

(21) Appl. No.: 09/951,075

(22) Filed: Sep. 13, 2001

(65) Prior Publication Data

US 2002/0033582 A1 Mar. 21, 2002

(30) Foreign Application Priority Data

Sep. 21, 2000 (EP) .......................................... 00120607

(51) Int. Cl.[7] .............................................. B23B 31/30
(52) U.S. Cl. ...................... 279/4.01; 279/4.12; 279/110
(58) Field of Search ........................ 279/4.01, 4.1–4.12, 279/110, 119

(56) References Cited

U.S. PATENT DOCUMENTS 3,926,446 A * 12/1975 Rohm ........................ 279/4.12
4,723,778 A * 2/1988 Kobayashi ................. 279/4.12
4,738,187 A * 4/1988 Rohm ........................ 279/4.01

FOREIGN PATENT DOCUMENTS

| DE | 3822506 | 7/1999 |
|---|---|---|
| EP | 0792720 | 9/1997 |
| FR | 2248901 | 5/1975 |
| JP | 11-156670 | 6/1999 |

OTHER PUBLICATIONS

Patent Abstract of Japan, Publication No. 11156670, Date of Publication of Application Jun. 15, 1999; Title: Grease Circulation System for Chuck with Counter Balance; Application No. 09348635; Date of Filing: Dec. 2, 1997, Applicant: Matsumoto Kikai Kogyo KK; Inventor: Matsumoto Eiichi.

* cited by examiner

*Primary Examiner*—Steven C. Bishop
(74) *Attorney, Agent, or Firm*—Olson & Hierl, Ltd.

(57) ABSTRACT

Moving parts of the chuck are enclosed in a sealed cavity which is provided with a circulating lubrication. The power which drives its flow is derived from the force needed for opening and shutting the tongs of the chuck. In a chuck with hydraulically actuated jaws, this power is delivered by the pressure differences that occur between different parts of the hydraulic circuit actuating the jaws of the chuck and the hydraulic liquid acts also as lubricant.

16 Claims, 1 Drawing Sheet

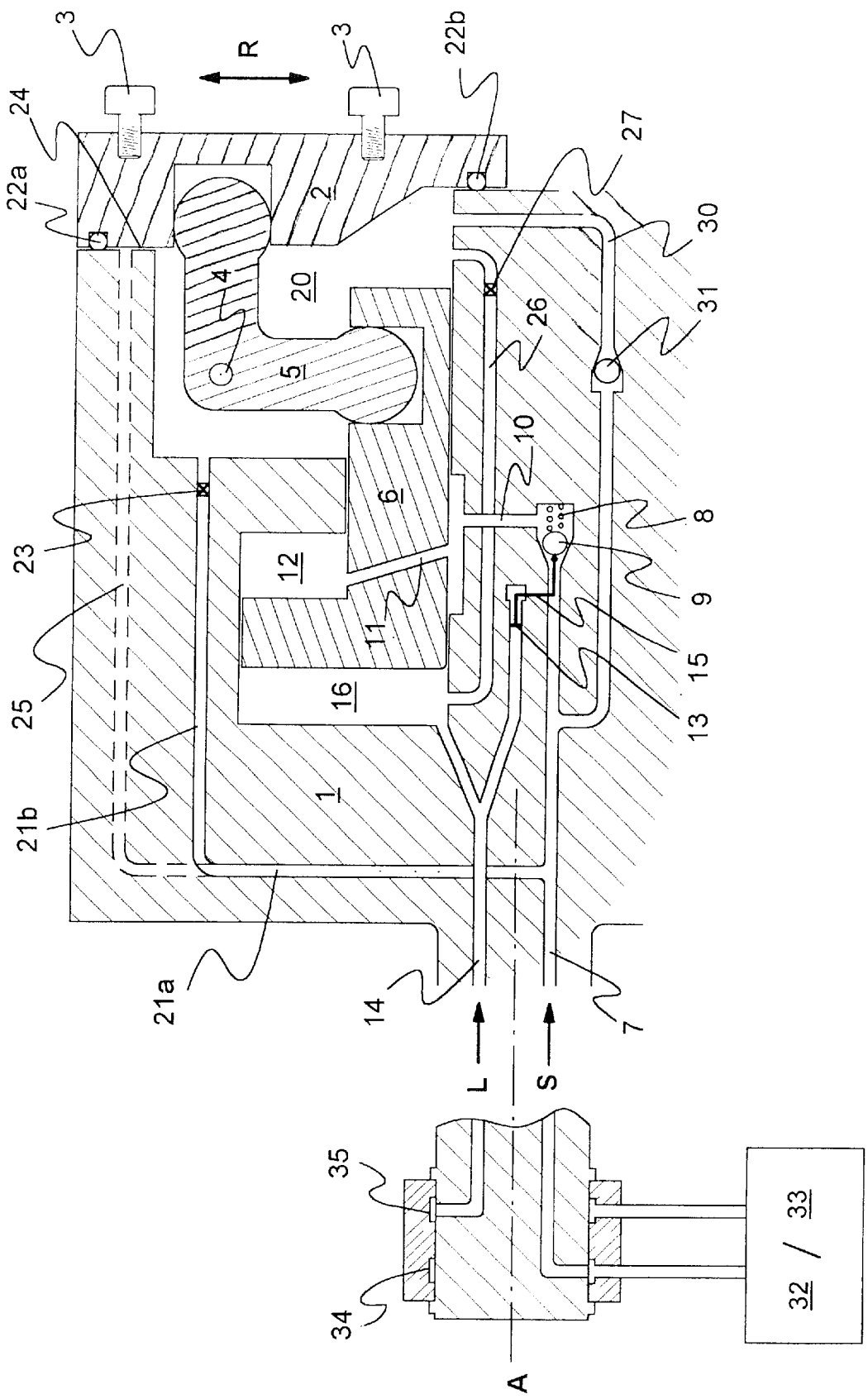

METHOD AND DEVICE FOR THE DYNAMIC LUBRICATION OF A POWER CHUCK

CROSS REFERENCE TO RELATED APPLICATIONS

This application claims the priority of European Patent application 00 120 607.7, filed Sep. 21, 2000, the disclosure of which is incorporated herein by reference in its entirety.

BACKGROUND OF THE INVENTION

Power chucks are used, amongst others, on fully automatic machine tools for manufacturing large series of workpieces machined with very high precision. Because of the high maintenance costs of chucks, they should have a long tool life between successive servicing operations, even when activated and released at a very high frequency for machining successive workpieces, and although they must generally work in an atmosphere full of abrasive dust generated by the grinding of hard steel, which quickly wears out all mechanisms exposed to it. It is known to protect the mechanism which activates and releases the jaws of a chuck from premature wear by enclosing it in a hermetically closed space inside the power chuck and more or less filled with oil. This noticeably reduces the wear of said mechanism—which is typically activated by hydraulic means—and thus greatly prolongs the interval between successive servicing of the chuck. Such an extension of the servicing interval can be crucial where a mass production is concerned.

However, this static greasing through an enclosed amount of oil has drawbacks. The oil supply must be topped up or replaced at regular intervals, which requires a periodic servicing and is costly on large automatic machine tools, the chuck of which is generally difficult to access. Further, it is usually impossible to maintain a given excess pressure with respect to the atmosphere in the space in which the mechanism to be protected is enclosed, because this space is necessarily sealed off by moving parts. Now such an excess pressure would be necessary in order to completely prevent the intake of foreign matter, in particular of grinding dust.

BRIEF SUMMARY OF THE INVENTION

Hence, it is a general object of the invention to remedy the above-mentioned drawbacks.

In order to implement these and still further objects of the invention, which will become more readily apparent as the description proceeds, the invention is defined as recited in the claims.

BRIEF DESCRIPTION OF THE DRAWINGS

The invention will be better understood and objects other than those set forth above will become apparent when considereaetion is given to the following detailed description thereof. Such desxcription makes reference to the annexed drawings, wherein the sole figure schematically shows a section through a preferred embodiment of the invention.

DETAILED DESCRIPTION OF THE INVENTION

The single figure shows a very schematical longitudinal section through a power chuck according to the invention with hydraulically activated jaws. In the drawing the letter A identifies the rotation axis of the chuck and reference number 1 its body. For a chuck with three jaws the parts shown in the drawing occur three times, at positions mutually offset by 120° around the rotation axis A. In order to simplify the drawing, it shows in one and the same section conduits which actually must lie in distinct planes rotated by a certain angle with respect to the axis A so that the conduits may avoid each other at the places where their paths apparently cross in the drawing. Although the invention can be readily applied to chucks with more or less than three jaws, only the embodiment with three jaws is considered in what follows because this is the most widespread type.

A main jaw 2 is mounted in the usual way, i.e., through a guide rail or bed track (not shown), on the main body 1, so that it can move radially (with respect to the axis A) relative to the main body, as shown by the double-headed arrow R. The main jaw support two screws 3 for mounting an auxiliary jaw (not shown); together with two further jaws (not shown either) rotated by 120°, it forms the tongs of the chuck. The radial movement of the main jaw 2, shown as vertical in the drawing, is urged by an angled lever 5 which swivels around an axis 4 and redirects the axial movement of a hydraulic piston 6 in the radial direction. In order to close the chuck, i.e., to move the main jaw towards the rotation axis A the piston 6 must move towards the left in the plane of the drawing. To achieve this, a hydraulic fluid—called oil for short in what follows—is pressed in an activating conduit 7 as indicated by the arrow S, by a pressure source 32 which is usually stationary.

In other embodiments redirecting the force needed for activating the chuck from the axial to a radial direction can be achieved in other known ways, e.g. by replacing the angled lever 5 by an angled wedge or other means.

A hermetic connection between the stationary pressure source 32 and the activating conduit 7 which rotates with the main body 1 of the chuck is obtained in a know way, e.g., through the use of rotary connections with hermetically sealed annular grooves 34, 35, and will hence not be shown or further described here. It shall be noted k however, that such rotary connections are comparatively expensive and take up a sizable room, so that it is desirable to limit their number as far as possible. The pressurized oil in the activating conduit flows, through a return valve 9 with a spring-pretensioned loaded ball by a helicoidal spring 8, a feeding conduit 10 in the main body, and a channel 11 provided in the piston 6, into a first chamber 12. The pressure in this chamber which is bounded in part by a working surface of the piston 6 urges the latter towards the lift in the drawing, thus rotating the angled lever clockwise and moving the main jaw 2, together with the auxiliary jaw (not shown) fixed on it towards the axis A. This, together with a corresponding movement of the two other jaws (not shown) angled at 120°, closes the tongs of the chuck. Thereafter the return valve 9 maintains the chuck closed even if the pressure, indicated by the arrow S, in the activating conduit 7 diminishes, whether on purpose or not. In order to release the tongs one reduces the pressure in the activating conduit and raises the pressure in a releasing conduit 14, as indicated by the arrow L. The return valve 9 is then opened against the force of the spring 8 through a transmitting mechanism 15 known to one skilled in the art (and only sketched schematically), which comprises a piston 13 urged by the pressure in the releasing conduit 14 and which in turn acts on the ball 9. Furthermore, the pressure existing in the releasing conduit 14 reaches a second chamber 16. Because the spring-loaded return valve is now open the oil can exit from the first chamber 12 through the channel 11, the intake conduit 10 and the return valve 9; hence the pressure in the second chamber 16 moves the piston 11 towards the right in the drawing, the angled lever 5 swivels counterclockwise and the main jaw 2 moves away from the rotation axis A. Due to the synchronous movements of the two other jaws (not shown) placed at angles of 120° around the axis A, the tongs of the chuck are now opened. The principle of the construction just described for hydraulically activating the tongs of a power chuck is known to those skilled in the art. The parts which are typical for a hydraulically activated power chuck embodying the invention shall now be described in more details.

The angled lever 5, or any equivalent piece such as a wedge hook, together with further mobile elements required for actuating the tongs but not shown in the drawing, are enclosed in a hermetically sealed cavity 20. Only two of the necessary gaskets are shown by way of example, to wit the gaskets 22a, 22b which seal gaps between the body 1 and the main jaw 2 in a way that allows a mutual movement between these parts in order to activate and release the tongs without jeopardizing the sealing of the chamber. For simplicity all other gaskets needed in order to hermetically close the cavity 20 are omitted, as are those required for a satisfactory working of the piston 6. The cavity 20 contains the same oil as that used for hydraulically urging the tongs, and means are provided for a progressive replacement of this oil, in particular when the chuck is repeatedly opened and shut, as will be described below.

A supply conduit 21a, 21b connects the activating conduit 7 with the cavity 20 and supplies it with oil when the activating conduit 7 is pressurized, i.e. when the tongs are closing or closed. A nozzle 23 is placed in the section 21b of the supply conduit in order to choke the supply of oil into cavity 20. Further, a bypass conduit 26 connects the cavity 20 with the second chamber 16 which is at a lower pressure than the activating conduit 7 when the tongs are closing or closed, so that oil can then flow from cavity 20 through the second chamber 16 into the releasing conduit 14. Thus, as long as the tongs are activated by an excess pressure in the activating conduit 7, there is a certain flow of oil through the cavity 20. A nozzle 27 placed in the bypass conduit 26 balances the action of nozzle 23 and regulates the flow from the activating conduit 7 through the cavity 20 and into the releasing conduit 14. Moreover, the nozzles 23, 27 ensure that the displacement of oil from the activating conduit 7 into the releasing conduit 14 produced by this flow only marginally reduces the pressure in the first chamber which is necessary for closing the tongs.

In another, preferred embodiment the section 21b of the supply conduit which is horizontal in the drawing is replaced by the section 25 shown in broken lines, which does not end directly in the cavity but in a slit 24 between the body 1 and the main jaw 2 for instance inside the bed track of this jaw. This bearing area 24 (only represented very schematically in the drawing) then acts as an oil groove. This is obtained by giving the bed track which guides the radial movement of the main jaw 2 relative to the body 1 a clearance of a few $\mu$. If, further, the bed track is closed on the outside by a seal 22a and by further necessary seals (not shown), it can also play the role of the nozzle 23, i.e. choke the flow of oil from the feeding conduit 21a into the cavity 20. This makes the nozzle 23 unnecessary and also ensures a flow of fresh oil through the slit of the bed track, thus reducing its wear and tear to an absolute minimum.

Now a state will be considered where the pressure in the releasing conduit 14 exceeds that in the activating conduit 7, in order to open the tongs. Oil then flows in the opposite direction, from the release conduit 14, through the by-pass 26, the nozzle 27, the cavity 20 and the feeding conduits 21a, 21b or 25, towards the activating conduit 7. If all flows were exactly symmetric and if on successive working cycles of the chuck the lengths of time where it is open and shut were exactly equal, then the oil in the cavity 20 would still be pressurized, but it would only move to and fro through the cavity, without being progressively renewed. However, such a perfect symmetry practically never occurs, so that one can count with near-certainty on a progressive renewal of the oil in the cavity, i.e. on a sustained dynamic lubrication of the angled lever 5 and of its auxiliary parts with fresh oil. Actually, geometrical constraints make a variation of the volume of the cavity 20 when the piston 6 moves practically unavoidable, which destroys the symmetry between the opening and the closing process of the tongs, because when the volume of the cavity diminishes more oil leaves it than enters it. This could result in an undesirably high pressure in the cavity, and the drawing shows how that can be avoided as will now be explained.

As described earlier, the piston 6 moves towards the right when the tongs open, and in the present embodiment this reduces the volume of the cavity 20. In order to avoid an excessive pressure in it, there is provided a discharge conduit 30 containing a second return valve 31 and which connects the cavity with a section of the activating conduit 7 situated upstream of the first return valve 9. Hence the excess oil can flow through this discharge conduit 30 into the activating conduit 7 which is not pressurized when the tongs are being opened. When they are being closed, the second return valve 31 placed in the discharge conduit 30 avoids the direct.

As described above, the invention ensures a dynamical lubrication with fresh oil of the angled lever 5 and of other parts, not shown here, of the actuating mechanism of he tongs. This includes elements, which strictly speaking are not located inside the cavity 20 but at it boundary, such as the bed track of the main jaw 2. One can calibrate the nozzles 23 and 27 in function or the duration of the working cycles of the chuck, the pressure in the activating and releasing conduits, ic. . . . in a way which ensures the desired quantity of oil, coming from the activating conduit 7 and leaving through the releasing conduits 14 and the annular groove 35 flows per time unit through the cavity 20 in the direction of a sink.

One must note, in addition that it is possible to modify the conduits and the nozzles in such a way as to obtain a net flow in the opposite direction when even this seems preferable, in particular for chucks where the volume of the cavity containing the actuating mechanism of the tongs diminishes when the tongs are being closed instead of increasing as is the case for the embodiment shown here.

Practice has shown that no problems arise from the use of the same oil for the hydraulic activation of the tongs of the power chuck and for the dynamic lubrication of the actuating mechanism of these tongs. It also showed that usual commercial hydraulic fluids are adequate for both purposes. Although the use of a combined conduit system for simultaneously activating the tongs and performing the dynamic lubrication is particularly attractive, note that the lubrication according to the invention can also be used with chucks the jaws of which are not actuated hydraulically but by some other means, e.g. magnetically or exclusively by mechanically means. This applies in particular to so-called "rear-end activated chucks", where the activating force—which is typically generated by pneumatic, hydraulic or electric means—is not transformed into a mechanical force within the chuck, i.e., near the front end of the spindle as in the present embodiment, but at the rear end of the spindle. This then is the place where the original driving power is transformed into a mechanical force through the use of electric motors, pistons or other means, which is then transmitted through the inside of the spindle by cables, rods or similar devices towards the front end of said spindle where it can act on the jaws of the chuck. Such an embodiment lacks the means described here for hydraulically transmitting a force and transforming it into a mechanical force inside the chuck. Generally the latter contains then only means for transforming available axial actuating forces into radial forces that act on the jaws. In such an embodiment the chuck according to the invention only comprises the input and output conduits and possibly the nozzles and seals needed to generate an appropriate flow in the lubrication circuit. The conduits can then either be connected to proprietary pressure sources and sinks intended for lubrication purposes only, or they may be connected at the rear end of the spindle with a hydraulic activating circuit for the tongs if such a circuit exists and the force which it generates is only transmitted mechanically from the rear end of the spindle to its front end. If, however, the jaws are not actuated hydraulically but for instance pneumatically or electrically, then the lubrication circuit will need feeding means of its own which can for instance be connected through [] separate rotary connection with sealed annular grooves at the rear of the spindle.

It turned out that the dynamic lubrication according to the invention makes for an extremely long tool life of the power chuck without any measurable wear of the mechanism of the tongs. This not only makes servicing practically unnecessary, which is essential for large production batches, but it indirectly improves the precision of the machining because the lack of any wear in the chuck keeps its gripping force at a constant value without readjustment, which in turn produces exactly reproducible machining process over extremely numerous cycles for a machine-tool provided with the chuck according to the invention. Further, when applied to hydraulically actuated chucks, the lubrication according to the invention necessitates no additional rotary connection between stationary pressure sources and sinks, and the conduits which rotate with the spindle.

While there are shown and described presently preferred embodiments of the invention, it is to be distinctly understood that the invention is not limited thereto but may be otherwise variously embodied and practiced within the scope of the following claims.

What is claimed is:

1. Method for lubricating moving parts of a power chuck (mounted on the headstock of a machine tool) characterized in that said parts are enclosed in an essentially sealed cavity or form a boundary of the same, and in that some lubricating fluid enters the cavity and/or leaves it during the opening and closing movements of the chuck.

2. Method according to claim 1, characterized in that the pressure of the fluid in the cavity at least some time exceeds the atmospheric pressure.

3. Method according to claim 2, characterized in that a bed track of at least one jaw of the chuck is fed with lubricating fluid flowing from the cavity.

4. Method according to claim 1 for a chuck with hydraulically actuated jaws, the actuating circuit of which comprises an activating conduit which delivers the pressure for closing the jaws and a releasing conduit which delivers the pressure for opening the jaws, characterized in the step of arranging either the activating channel to serve as the supply channel and the releasing conduit serving as the discharge channel, or vice-versa.

5. Method according to claim 2 for a chuck with hydraulically actuated jaws, the actuating circuit of which comprises an activating conduit which delivers the pressure for closing the jaws and a releasing conduit which delivers the pressure for opening the jaws, characterized in the step of arranging either the activating channel to serve as the supply channel and the releasing conduit serving as the discharge channel, or vice-versa.

6. Method according to claim 3 for a chuck with hydraulically actuated jaws, the actuating circuit of which comprises an activating conduit which delivers the pressure for closing the jaws and a releasing conduit which delivers the pressure for opening the jaws, characterized in the step of arranging either the activating channel to serve as the supply channel and the releasing conduit serving as the discharge channel, or vice-versa.

7. Power chuck for movable elements or opening and closing its jaws, characterized in that at least one such element is enclosed in or forms a boundary of an essentially sealed cavity which is at least temporarily connected through at least one supply channel with a source of lubricating fluid and at least temporarily connected through at least one discharge channel with a sink for the lubricating fluid.

8. Power chuck according to claim 7 characterized in that a slit of a bed track of at least one jaw of the chuck communicates with the cavity.

9. Power chuck according to claim 7, characterized in that the source and the sink for the lubricating fluid are stationary.

10. Power chuck according to claim 9, characterized in that a slit of a bed track of at least one jaw of the chuck communicates with the cavity.

11. Power chuck according to claim 7, where the jaws of the chuck are actuated by a hydraulic circuit he actuating circuit of which comprises an activating conduit which delivers the pressure for closing the jaws and a releasing conduit which delivers the pressure for opening the jaws, characterized in that either the activating conduit serves as the supply channel and the releasing conduit serves as the discharge channel, or vice-versa.

12. Power chuck according to claim 11, characterized in that the cavity is connected to the actuating conduit and/or to the releasing conduit through at least one passage in which fluid can flow towards the respective conduit when the pressure in the cavity exceeds that in said conduit.

13. Power chuck according to claim 12, characterized in that the actuating circuit comprises a cylinder and piston unit operating the jaws of the chuck, and that there is a return valve between said unit and the activating conduit, said return valve blocking the flow away from the unit unless it is released through the action of the pressure in the release conduit.

14. Power chuck according to claim 13, characterized in that a passage connects the cavity to a place in the activating circuit which lies on the side of the return valve facing away from the cylinder and piston unit, and that said passage contains a one-way valve which only allows a flow of fluid way from the cavity.

15. Power chuck according to claim 7, characterized in that the supply channel and/or the discharge channel contain a choking nozzle.

16. Power chuck according to claim 13, characterized in that the supply channel and/or the discharge channel contain a choking nozzle.

* * * * *